(12) United States Patent
Fujii et al.

(10) Patent No.: US 11,986,901 B2
(45) Date of Patent: May 21, 2024

(54) FRICTION STIR WELDING TOOL AND FRICTION STIR WELDING METHOD

(71) Applicants: NGK SPARK PLUG CO., LTD., Nagoya (JP); OSAKA UNIVERSITY, Osaka (JP)

(72) Inventors: Hidetoshi Fujii, Suita (JP); Yoshiaki Morisada, Suita (JP); Yusuke Katsu, Nagoya (JP); Hiroki Takeuchi, Nagoya (JP)

(73) Assignees: NTK CUTTING TOOLS CO., LTD., Komaki (JP); OSAKA UNIVERSITY, Suita (JP)

( * ) Notice: Subject to any disclaimer, the term of this patent is extended or adjusted under 35 U.S.C. 154(b) by 103 days.

(21) Appl. No.: 17/291,557

(22) PCT Filed: Mar. 6, 2020

(86) PCT No.: PCT/JP2020/009861
§ 371 (c)(1),
(2) Date: May 5, 2021

(87) PCT Pub. No.: WO2020/184483
PCT Pub. Date: Sep. 17, 2020

(65) Prior Publication Data
US 2022/0001486 A1 Jan. 6, 2022

(30) Foreign Application Priority Data

Mar. 8, 2019 (JP) ................................ 2019-042785

(51) Int. Cl.
*B23K 20/00* (2006.01)
*B23K 20/12* (2006.01)
*B23K 103/04* (2006.01)

(52) U.S. Cl.
CPC ...... *B23K 20/1255* (2013.01); *B23K 2103/04* (2018.08)

(58) Field of Classification Search
CPC .............. B23K 20/1225; B23K 20/123; B23K 2103/08; B23K 11/317; B23K 11/318;
(Continued)

(56) References Cited

U.S. PATENT DOCUMENTS 5,370,751 A * 12/1994 von Hagen ............. C22C 38/38
148/333
2002/0011509 A1 1/2002 Nelson et al.
(Continued)

FOREIGN PATENT DOCUMENTS

CN 104139239 A 11/2014
EP 3868507 A1 8/2021
(Continued)

OTHER PUBLICATIONS

European Patent Office, Extended European Search Report issued in corresponding Application No. EP 20768918.3 dated Nov. 21, 2022.
(Continued)

*Primary Examiner* — Erin B Saad
(74) *Attorney, Agent, or Firm* — Stites & Harbison, PLLC; Jeffrey A. Haeberlin; James R. Hayne

(57) ABSTRACT

A friction stir welding tool (1) has a shoulder portion (2) and a probe portion (6) provided on a bottom surface of the shoulder portion (2). The probe portion (6) has a length of 5.5 mm or more. In the friction stir welding tool (1), a ceramic material whose main phase is silicon nitride or sialon is used as a base material.

10 Claims, 9 Drawing Sheets

(58) Field of Classification Search
CPC .............. B23K 20/1245; B23K 20/125; B23K 20/126; B23K 20/1265; B23K 20/1275; B23K 2101/18; B23K 2103/04
See application file for complete search history.

(56) References Cited

U.S. PATENT DOCUMENTS

| | | |
|---|---|---|
| 2002/0014516 A1 | 2/2002 | Nelson et al. |
| 2004/0134972 A1 | 7/2004 | Nelson et al. |
| 2004/0155093 A1 | 8/2004 | Nelson et al. |
| 2004/0195291 A1 | 10/2004 | Andersson et al. |
| 2006/0175382 A1 | 8/2006 | Packer et al. |
| 2007/0102492 A1 | 5/2007 | Nelson et al. |
| 2010/0146866 A1 | 6/2010 | Nelson et al. |
| 2011/0297733 A1 | 12/2011 | Nelson et al. |
| 2013/0062395 A1 | 3/2013 | Nelson et al. |
| 2014/0034709 A1 | 2/2014 | Oki et al. |
| 2014/0034710 A1 | 2/2014 | Nelson et al. |
| 2016/0263697 A1 | 9/2016 | Matsushita et al. |
| 2019/0168337 A1 | 6/2019 | Fujii et al. |

FOREIGN PATENT DOCUMENTS

| | | | |
|---|---|---|---|
| GB | 2306366 A | * 5/1997 | ......... B23K 20/1255 |
| JP | 2003-532543 A | 11/2003 | |
| JP | 2004-522591 A | 7/2004 | |
| JP | 2011-116597 A | 6/2011 | |
| JP | 2014-014821 A | 1/2014 | |
| JP | 2018-153848 A | 10/2018 | |
| WO | 2015-068386 A1 | 5/2015 | |
| WO | 2017-154658 A1 | 9/2017 | |
| WO | 2018-030308 A1 | 2/2018 | |

OTHER PUBLICATIONS

Japan Patent Office, International Search Report issued in International Phase Application No. PCT/JP2020/009861, dated Apr. 7, 2020.

The State Intellectual Property Office of People's Republic of China, The First Office Action issued in corresponding Application No. 202080008666.5 dated Apr. 6, 2022.

* cited by examiner

FRICTION STIR WELDING TOOL AND FRICTION STIR WELDING METHOD

TECHNICAL FIELD

The present invention relates to a friction stir welding tool and to a friction stir welding method.

BACKGROUND ART

Friction stir welding (FSW) has been known as a typical sold phase joining method for metal materials. In friction stir welding, metal members to be joined together are disposed such that their portions to be joined together face each other, a probe provided at a distal end of a rotation tool is inserted into the to-be joined portions, and the rotation tool is moved along the interface between the to-be joined portions while being rotated. As a result of friction heat and stirring force of the rotation tool, the materials of the metal members flow, whereby the two metal members are joined together. A feature of friction stir welding is that the highest temperature reached during a joining process is lower than the melting point of the metal members to be joined, and therefore, a decrease in strength at the joint is smaller as compared with conventional fusion welding. By virtue of this feature, practical application of friction stir welding has progressed rapidly in recent years.

Friction stir welding has various excellent features. However, since a tool higher in strength than members to be joined must be pressed into the members and a large stress acts on the tool, the cost and life of the tool may become significant problems, depending on the types of members to be joined. Specifically, in the case where thin plates formed of a relatively soft metal such as aluminum or magnesium are joined together, the load imposed on the tool is small, and problems associated with tool life and joining conditions do not arise. However, in the case where plates formed of a metal having a high melting point such as steel or titanium are joined together, tool life becomes extremely short. In particular, in the case of joining thick plates, this becomes a more serious problem. When joining cost, the range of joining conditions for obtaining satisfactory joints, etc., are considered, in reality, industrially usable tools hardly exist.

For example, in Patent Literature 1 (Japanese Kohyo Patent Publication No. 2004-522591), a friction stir welding tool having a shaft and a tapered probe is proposed. The probe has a plurality of helical twisted surfaces extending in the direction from a base portion of the probe to a distal end portion of the probe. The diameter of the probe, in a longitudinal cross section thereof, decreases continuously from the base portion to the distal end portion.

According to the description in Patent Literature 1, the friction stir welding tool disclosed in Patent Literature 1 can weld workpieces thicker than those for which friction stir welding has been tried conventionally, can prevent formation of defects, and can maintain the workpieces at a proper temperature during a joining process.

Also, in Patent Literature 2 (Japanese Kohyo Patent Publication No, 2003-532543), a friction stir welding tool capable of friction stir welding metal matrix composites (MMCs), ferrous alloys, non-ferrous alloys, and superalloys is proposed. The tool includes a shank, a shoulder, a pin, and a highly wear resistant material disposed on at least a portion of the shoulder and the pin. The shoulder is mechanically locked to the shank to thereby prevent rotational movement of the shoulder relative to the shank. The highly wear resistant material has a first phase and a secondary phase, and the highly wear resistant material is manufactured under ultrahigh temperature and ultrahigh pressure conditions. The friction stir welding tool is capable of functionally performing friction stir welding of MMCs, ferrous alloys, non-ferrous alloys, and superalloys. Patent Literature 2 discloses that polycrystalline cubic boron nitride (PCBN) or polycrystalline diamond (PCD) is used as the highly wear resistant material.

According to the description in Patent Literature 2, the friction stir welding tool disclosed in Patent Literature 2 can perform friction stir welding on materials which cannot be joined through use of a conventional friction stir welding method and a conventional friction stir welding tool; namely, ferrous alloys such as stainless steel and high-melting-point superalloys which contain iron in a small amount or contain no iron.

CITATION LIST

Patent Literature

Patent Literature 1: Japanese Kohyo Patent Publication No. 2004-522591
Patent Literature 2: Japanese, Kohyo Patent Publication No. 2003-532543

SUMMARY OF INVENTION

Technical Problem

However, since the friction stir welding tool disclosed in Patent Literature 1 has a plurality of helical twisted surfaces, it is difficult to manufacture the friction stir welding tool by using a ceramic material. Also, since the friction stir welding tool is elongated and has a complex shape, the friction stir welding tool easily breaks when the stress acting on the tool is large as in the case of friction stir welding of steel members. These become serious problems in particular when friction stir welding is performed on thick plates.

Since the friction stir welding tool disclosed in Patent Literature 2 is manufactured under ultrahigh temperature and ultrahigh pressure conditions, manufacture of a large tool for thick plates is extremely difficult. In addition, as a result of an increase in tool size, production cost increases greatly, so that manufactured tools become too expensive for ordinary industrial applications.

The present invention has been accomplished so as to solve the problems of the conventional techniques as described above, and an object of the present invention is to provide an inexpensive friction stir welding tool which can be used for friction stir welding of thick plates having a thickness of 6 mm or more and which can also be used for friction stir welding of thick steel plates. Another object of the present invention is to provide a friction stir welding method in which the friction stir welding tool is used.

Solution to Problem

In order to achieve the above-described object, the present inventors carried out intensive studies on the shapes, materials, etc., of friction stir welding tools. As a result of the intensive studies, the present inventors found that it is extremely effective to use, as a base material of a friction stir welding tool, a ceramic material whose main phase is silicon nitride or sialon and to optimize the sizes and shapes of a probe portion and a shoulder portion of the friction stir welding tool, and thereby completed the present invention.

Namely, the present invention provides a friction stir welding tool comprising:
a shoulder portion; and
a probe portion provided on a bottom surface of the shoulder portion, wherein
the probe portion has a length of 5.5 mm or more, and
a ceramic material whose main phase is silicon nitride or sialon is used as a base material.

No particular limitation is imposed on the shapes of the shoulder portion and the probe portion so long as the effect of the present invention is not impaired. The shoulder portion and the probe portion may have respective shapes selected from various conventionally known shapes. Since the friction stir welding tool of the present invention is used for friction stir welding of plate members each having a thickness of 6 mm or more, the probe has a length of 5.5 mm or more. Notably, depending on the shape of the tool and/or the conditions of friction stir welding, a stirring region of some size is formed below the bottom surface of the probe. Therefore, even in the case where the probe length is slightly smaller than the plate thickness, a defect-free joint can be obtained.

Also, in the friction stir welding tool of the present invention, a ceramic material whose main phase is silicon nitride or sialon is used as the base material of the tool. The main constituent elements of silicon nitride and sialon are Si and N, which are abundant and inexpensive resources. In addition, a special firing apparatus which applies ultrahigh temperature and ultrahigh pressure is not required. Therefore, the production cost per friction stir welding tool can be reduced by increasing the number of friction stir welding tools manufactured. In addition, since machining of the ceramic material is easier as compared with polycrystalline cubic boron nitride (PCBN) and polycrystalline diamond (PCD), any of various shapes can be imparted to the tool.

Since a ceramic material whose main phase is silicon nitride or sialon is used as the base material of the tool, the tool can have strength, durability, etc., which are sufficient for performing friction stir welding on high-melting-point metal such as steel. Also, since the ceramic material is low in thermal conductivity, the friction stir welding tool has enhanced heat storing performance. As a result, joining temperature easily rises, and friction stir welding can be achieved within a relatively short period of time.

In the friction stir welding tool of the present invention, preferably, the probe portion decreases in diameter continuously from the bottom surface toward a distal end of the probe portion, and grooving and/or chamfering is not performed on the probe portion. By tapering the probe portion such that its root portion is thick and its distal end portion is thin, it becomes possible to prevent breakage starting from the root of the probe portion and formation of a defect near the distal end of the probe. In the vicinity of the distal end of the probe, production of a sufficient plastic flow is difficult. However, since the probe diameter is small in that region, only a small space is formed as a result of passage of the probe, whereby formation of a defect in that region is prevented. Moreover, the tapered probe portion can generate a downward material flow in the thickness direction, which is effective for formation of a satisfactory stirred portion, in particular, in friction stir welding of thick plates.

In the case where the plastic flow produced as a result of interaction between the tool surface and members to be joined (hereinafter referred to as "workpieces") is insufficient, it is necessary to perform grooving (thread cutting) or chamfering on the probe portion so as to increase stirring power, thereby promoting the plastic flow. However, when such machining is performed, breakage at the probe portion becomes more likely to occur due to, for example, concentration of stress on a machined portion. In view of this, the present inventors have carried out many experiments and found the following. In the case of a friction stir welding tool in which a ceramic material whose main phase is silicon nitride or sialon is used as its base material, the temperatures of the workpieces near the tool surface increase easily. Therefore, even when a friction stir welding tool having an un-machined probe is used, the friction stir welding tool can produce a plastic flow sufficient for formation of a defect-free stirred portion, and a satisfactory joint is obtained even in friction stir welding of thick plates.

Also, in the friction stir welding tool of the present invention, preferably, the shoulder portion has a diameter of 20 mm or less. In general, the diameter of the shoulder portion must be increased with an increase in the length of the probe portion, and therefore, a friction stir welding tool for thick plates is large in size. This is because, in friction stir welding of thick plates, it is difficult to produce a sufficient plastic flow reaching a point near the back surfaces of the thick plates, and a larger shoulder portion is needed for promoting the plastic flow. However, in the case where a ceramic material whose main phase is silicon nitride or sialon is used as the base material of the tool, a sufficient plastic flow is produced at the surface of the probe portion. Therefore, even when the shoulder portion has a diameter of 20 mm or less, a satisfactory stirred portion can be formed in friction stir welding of thick workpieces plates each having a thickness of 6 mm or more. By setting the diameter of the shoulder portion to 20 mm or less, an increase in size of the tool can be prevented, and the price of the tool can be lowered. Since the price of the ceramic material is greatly influenced by its size, the cost reduction effect achieved by reduction of the size of the shoulder portion is extremely large.

Also, in the friction stir welding tool of the present invention, preferably, the length of the probe portion is 9.5 mm or more. More preferably, the length of the probe portion is 11.5 mm or more. Most preferably, the length of the probe portion is 14.5 mm or more. The friction stir welding tool of the present invention can be used for steel plates each having a thickness of 12 mm or more and can be used for steel plates each having a thickness of 15 mm or more. Notably, the "thickness" corresponds to a depth of insertion of the friction stir welding tool in the case where friction stir welding is performed for plate members overlapping each other.

Further, in the friction stir welding tool of the present invention, preferably, the ceramic material contains a rare-earth element and aluminum. Since the ceramic material contains a rare-earth element and aluminum, the friction stir welding tool can maintain wear resistance while maintaining sinterability. More preferably, the ceramic material contains aluminum in an amount of 1.5 to 6 wt % and a rare-earth element in an amount of 1.5 to 10 wt %.

Also, the present invention provides a friction stir welding method characterized in that plate members are friction stir welded by using the friction stir welding tool of the present invention; and the shoulder portion of the friction stir welding tool is brought into contact with the plate members, while the probe portion of the friction stir welding tool is inserted into the plate members by an amount of 5.5 mm or more. As described above, the friction stir welding tool of the present invention is inexpensive even when the probe length is 5.5 mm or more. Therefore, cost of joining thick plates by using friction stir welding can be reduced greatly.

In addition, since joining temperature increases quickly and plastic flows of workpieces easily occur near the tool surface, a satisfactory joint can be obtained within a short joining time. Since the friction stir welding tool of the present invention easily stores heat, preferably, a tool holder for holding the tool has heat resistance and strength. Specific examples of the material of the tool holder include cemented carbide, nickel-base superalloy, cobalt-base superalloy, and various types of heat-resistant steels.

Also, in the friction stir welding method of the present invention, preferably, the plate members are steel plates, and more preferably, the steel plates contains carbon in an amount of 0.2 mass % or more. Since the friction stir welding tool of the present invention has excellent heat resistance and excellent mechanical properties, the friction stir welding tool can be preferably used for friction stir welding of steel plates. Also, the material flow resistance of steel decreases as the carbon content increases, and the amount of wear of the surface of the friction stir welding tool can be reduced by setting the carbon content to 0.2 mass % or more. Since melt welding of steel whose carbon content is 0.2 mass % or more extremely difficult, the merit attained through use of friction stir welding, which is solid phase bonding, is large.

Also, in the friction stir welding method of the present invention, preferably, the position of the friction stir welding tool is held for a predetermined period of time after the probe portion has been inserted into the plate members, and the friction stir welding tool is moved laterally after reaction forces applied from the plate members to the friction stir welding tool have decreased. In general, in the case of friction stir welding of thick plates, the load in the Z-axis direction (vertical load) becomes the maximum at the time of insertion of the friction stir welding tool. Since the friction stir welding tool of the present invention is smaller in thermal conductivity than general friction stir welding tools, the friction stir welding tool of the present invention can efficiently increase the temperatures of the workpieces near the tool surface and soften the workpieces. As a result, the load in the Z-axis direction can be reduced greatly by holding the friction stir welding tool at the inserted position after having inserted the friction stir welding tool. Also, damage to the tool and lifting of the tool can be prevented by moving the friction stir welding tool laterally after the load in the Z-axis direction has decreased.

Further, in the friction stir welding method of the present invention, preferably, a backing plate whose thermal conductivity is lower than those of the plate members is disposed on the back surfaces of the plate members. As a result of disposition of a backing plate whose thermal conductivity is lower than those of the plate members on the back surfaces of the plate members, the temperatures of the plate members near the back surfaces thereof during friction stir welding can be increased, whereby the load of the friction stir welding tool in the Z-axis direction can be reduced greatly. In addition, the temperature distribution in the thickness direction becomes non-uniform when the thickness of the plate members increases. However, it is possible to make the temperature distribution uniform, thereby homogenizing the micro structure of the stirred portion in the thickness direction. A plate formed of silicon nitride is preferably used as the backing plate.

ADVANTAGEOUS EFFECTS OF INVENTION

The present invention provides an inexpensive friction stir welding tool which can be used for friction stir welding of thick plates having a thickness of 6 mm or more and which can be also used for friction stir welding of thick steel plates. Further, the present invention provides a friction stir welding method in which the friction stir welding tool is used.

DESCRIPTION OF EMBODIMENTS

Figure 1:
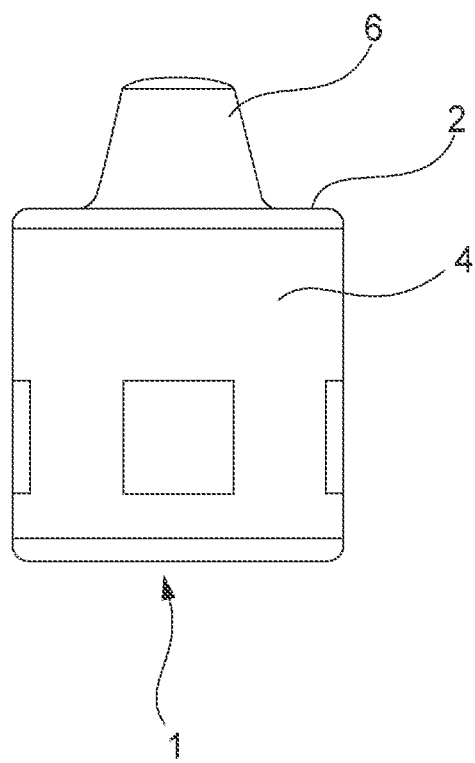
FIG. 1 is a schematic side view showing an example of a friction stir welding tool of the present invention.

Now, typical embodiments of a friction stir welding tool and a friction stir welding method of the present invention will be described in detail with reference to the drawings. However, the present invention is not limited only to the embodiments. In the following description, the same or corresponding portions are denoted by the same reference numerals and their redundant descriptions may be omitted. Since the drawings are used for conceptually describing the present invention, the dimensions of constituent elements illustrated in the drawings and their dimensional ratios may differ from the actual dimensions and ratios.

(1) Friction Stir Welding Tool

FIG. 1 shows a schematic side view showing an example of the friction stir welding tool of the present invention. The friction stir welding tool 1 of the present invention includes a body portion 4 having a shoulder portion 2, and a probe portion 6 provided on a bottom surface of the body portion 4. The length of the probe portion 6 is 5.5 mm or more. The base material of the friction stir welding tool 1 is a ceramic material whose main phase is silicon nitride or sialon. The shoulder portion 2 and the probe portion 6 may be formed of ceramic materials having the same composition and structure or may be formed of ceramic materials which differ in composition and/or structure. The surface of the shoulder portion 2 and/or the surface of the probe portion 6 may be covered with a hard film formed by, for example, PVD or CVD.

Since the friction stir welding tool 1 is used for friction stir welding of plate members having a thickness of 6 mm or more, the probe portion 6 has a length of 5.5 mm or more. Depending on the shape of the tool and/or the conditions of friction stir welding, a stirring region of some size is formed below the bottom surface of the probe portion 6. Therefore, even in the case where the probe length is slightly smaller than the plate thickness, a defect-free joint can be obtained. The length of the probe portion 6 is preferably 9.5 mm or more, more preferably 11.5 mm or more, and most preferably, 14.5 mm or more.

Preferably, the diameter of the probe portion 6 decreases continuously in the direction from the bottom surface of the shoulder portion 2 to a distal end portion of the probe portion 6, and grooving and/or chamfering is not performed on the probe portion 6. No particular limitation is imposed on the taper angle of the probe portion 6 so long as the effect of the present invention is not impaired. For example, in the case where the length of the probe portion 6 is 5.75 mm, the probe portion 6 may have a diameter of 7 mm at its root and a diameter of 6 mm at its distal end.

It is preferred that grooving and/or chamfering is not performed on the surface of the probe portion 6. Since the probe portion 6 has a smooth surface not subjected to these machining processes, breakage and wear of the probe portion 6 during friction stir welding can be prevented even through the base material of the probe portion 6 is a ceramic material whose main phase is silicon nitride or sialon. Notably, it is preferred that the surface roughness of the probe portion 6 is 0.1 μm to 1.0 μm in Sa. Meanwhile, since a ceramic material whose main phase is silicon nitride or sialon is used as the base material, workpieces can be heated and stirred efficiently. Therefore, even the probe portion 6 not having subjected to grooving and/or chamfering can form a sufficiently large stirred portion.

No particular limitation is imposed on the shape and size of the shoulder portion 2 so long as the effect of the present invention is not impaired. However, the shoulder portion 2 preferably has a diameter of 20 mm or less. In the case where a ceramic material whose main phase is silicon nitride or sialon is used as the base material, a sufficient plastic flow occurs at the surface of the probe portion 6. Therefore, even in the case where the diameter of the shoulder portion 2 is 20 mm or less, a satisfactory stirred portion can be formed even when the thickness of workpieces is 6 mm or more. By setting the diameter of the shoulder portion 2 to 20 mm or less, an increase in the size of the friction stir welding tool 1 can be prevented, and the price of the friction stir welding tool can be lowered. In addition, the width of the surface of the joint portion ca be reduced.

As to the surface of the shoulder portion 2 too, it is preferred that grooving is not performed. Since the surface of the shoulder portion 2 is smooth, the amount of wear during friction stir welding can be reduced, whereby a change in the shape of the shoulder portion 2 can be prevented. Meanwhile, since a ceramic material whose main phase is silicon nitride or sialon is used as the base material of the shoulder portion 2, workpieces can be heated and stirred efficiently. Therefore, even in the case where the surface of the shoulder portion 2 is not subjected to grooving, a sufficiently large stirred portion can be formed.

No particular limitation is imposed on the ceramic material whose main phase is silicon nitride or sialon and which is used as the base material of the friction stir welding tool 1, so long as the effect of the present invention is not impaired. The base material may be any ceramic material selected from conventionally known various types of silicon-nitride-based ceramic materials and sialon-based ceramic materials. It is preferred that the ceramic material contains a rare-earth element and aluminum. The ceramic material containing a rare-earth element and aluminum can maintain wear resistance, while maintaining sinterability. More preferably, the ceramic material contains aluminum in an amount of 1.5 to 6 wt % and a rare-earth element in an amount of 1.5 to 10 wt %. Notably, although the ceramic material may contain a sintering aid, it is preferred that the amount of the sintering aid is small.

(2) Friction Stir Welding

Figure 2:
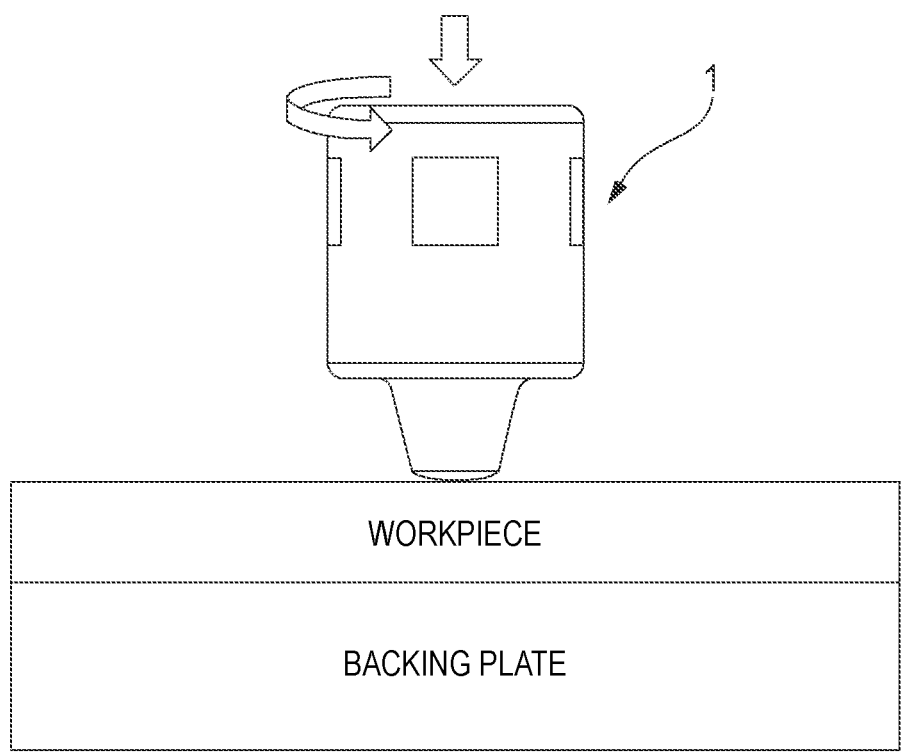
FIG. 2 is a schematic view showing a state of general friction stir welding.

The friction stir welding method of the present invention is characterized in that plate members are friction stir welded by using the friction stir welding tool 1 in such a manner that the probe portion 6 is inserted into the plate members by an amount of 5.5 mm or more and the shoulder portion 2 is brought into contact with the plate members. FIG. 2 shows the state of general friction stir welding. The workpieces are disposed on a backing plate, and the rotated friction stir welding tool 1 is pressed into the workpieces from their front surface sides so as to generate a plastic flow. Since the friction stir welding tool 1 is inexpensive even when its probe length is 5.5 mm or more, the cost involved in joining thick plates by using friction stir welding can be reduced greatly. In addition, the joining temperature increases quickly, and plastic flows of the workpieces easily occur near the surface of the tool. Therefore, it is possible to obtain a satisfactory joint within a short joining time, while preventing breakage and wear during friction stir welding.

The plate members, which are workpieces (members to be joined), are preferably steel plates. The carbon content of the steel plates is more preferably 0.2 mass % or higher, most preferably 0.4 mass % or higher. Although the hardness and strength of the steel plates at room temperature increase with the carbon content, material flow stress decreases as the carbon content increases, in the joining temperature range of the friction stir welding. Namely, since steel plates whose carbon content is relatively large are used as workpieces, the range of proper joining conditions for obtaining a defect-free stirred portion can be expanded, while breakage and wear of the friction stir welding tool 1 can be prevented. Although the friction stir welding tool 1 whose base material is a ceramic material containing silicon nitride or sialon as its main phase has mechanical properties which enable the tool to perform friction stir welding for thick steel plates, the friction stir welding tool 1 is inferior in wear resistance to tools formed of PCBN. However, the life of the friction stir welding tool 1 can be extended by selecting workpieces having proper carbon contents.

When friction stir welding is performed, it is preferred to maintain the position of the friction stir welding tool 1 for a predetermined period of time after having inserted the probe portion 6 into the plate members, and then move the friction stir welding tool 1 laterally after reaction forces applied from the plate members to the friction stir welding tool 1 have decreased. Tool position control, load control, and torque control are mainly used for controlling friction stir welding. However, it is preferred to use position control so as to maintain the position of the friction stir welding tool 1 for a predetermined period of time. Also, in the case of friction stir welding of thick steel plates, since the maximum load in the z-axis direction imposed on the friction stir welding tool 1 may become 10 tons or greater, it is preferred to use a highly rigid friction stir welding apparatus which can endure the reaction force generated as a result of application of the load.

Also, a material lower in thermal conductivity than the workpieces is preferably used on the back side. Specifically, a backing plate lower in thermal conductivity than the workpieces is disposed on the back surfaces of the workpieces. As a result, it is possible to increase the temperatures of the workpieces near their back surfaces during friction stir welding, thereby greatly decreasing the z-axis direction load of the friction stir welding tool 1. When the thickness of the plate members increases, the temperature distribution in the thickness direction becomes non-uniform. However, it is possible to make the temperature distribution uniform, thereby homogenizing the micro structure of the stirred portion in the thickness direction. From the viewpoint of thermal conductivity, zirconia, mullite, cermet, alumina, sialon, silicon nitride, or the like can be used as the material of the backing plate. However, use of silicon nitride or sialon is preferred from the viewpoint of strength and durability when used as a backing plate.

Typical embodiments of the present invention have been described. However, the present invention is not limited to these embodiments, and various design alterations are possible. All such design alterations fall within the technical scope of the present invention.

EXAMPLES

Example 1

Figure 3:
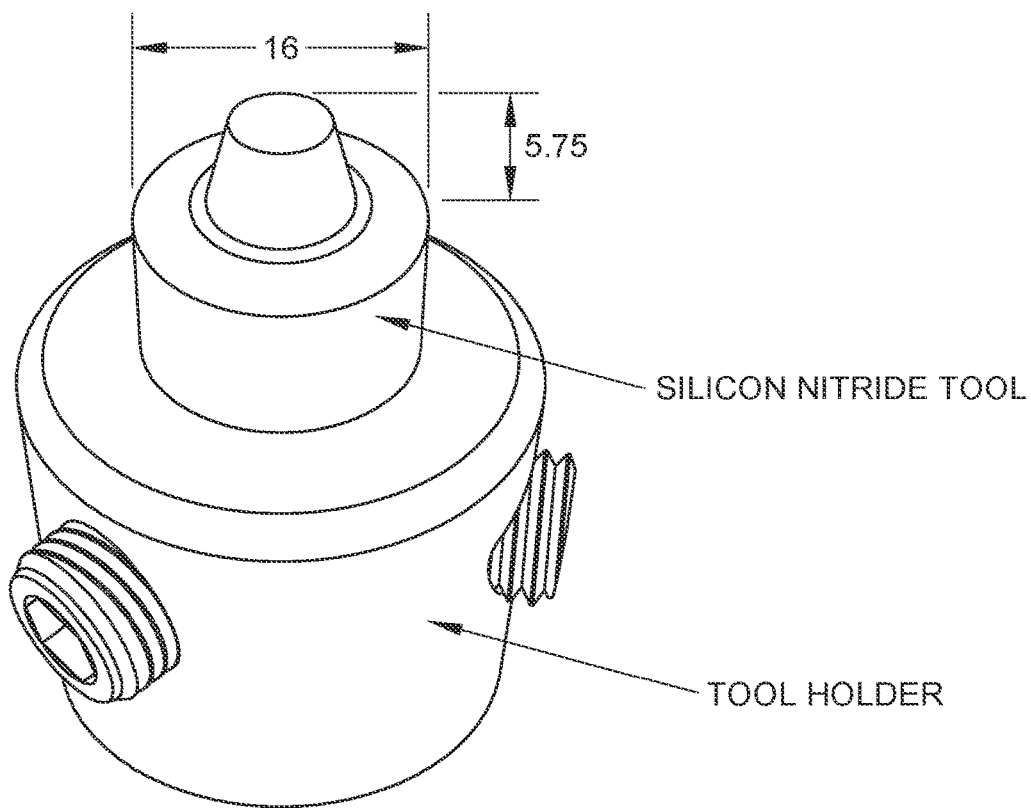
FIG. 3 is an exterior photograph of a silicon nitride tool used in Example 1.

By using a silicon nitride tool having a probe length of 5.75 mm, stir-in-plate friction stir welding was performed on low carbon steel plates and medium carbon steel plates each having a thickness of 6 mm. Table 1 shows the compositions of the low carbon steel plates and the medium carbon steel plates, and FIG. 3 shows an exterior photograph of the silicon nitride tool. Notably, the amounts of components are represented by mass %. The shoulder diameter is 16 mm, the probe diameter at the root (shoulder bottom surface) is 7 mm, and the probe diameter at the distal end is 6 mm. Grooving or the like machining is not performed on the shoulder bottom surface and the probe surface, and these surfaces are smooth surfaces. A backing plate formed of tool steel was disposed on the back surfaces of the workpieces.

TABLE 1

| Material | C | Si | Mn | P | Fe |
|---|---|---|---|---|---|
| Medium carbon steel | 0.56 | 0.23 | 0.72 | 0.13 | Bal. |
| Low carbon steel | 0.21 | ≤0.35 | 0.90 | ≤0.03 | Bal. |

The silicon nitride tool is integrally molded and its material is silicon nitride or sialon formed by using, as a sintering aid, an oxide and/or a nitride of aluminum and a rare-earth element. Notably, the tool contains the rare-earth element in an amount of 1.5 to 10 wt %, and aluminum in an amount of 1.5 to 6 wt %.

Figure 4:
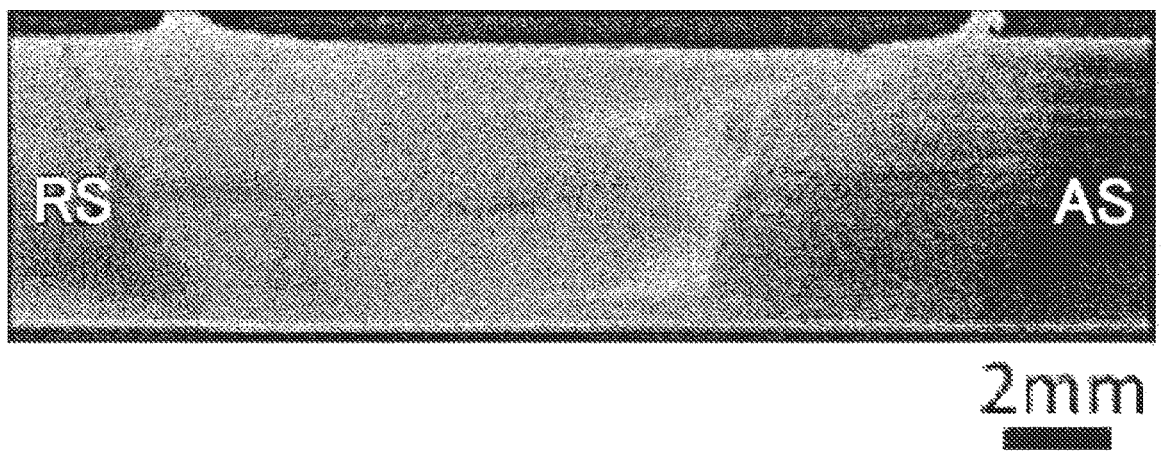
FIG. 4 is a sectional macro photograph of a low carbon steel stirred portion obtained in Example 1.
Figure 5:
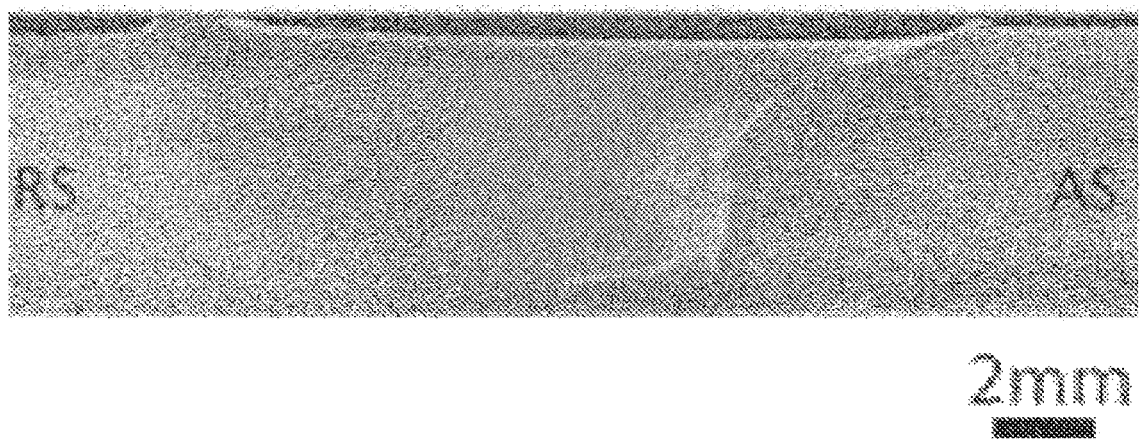
FIG. 5 is a sectional macro photograph of a medium carbon steel stirred portion obtained in Example 1.

The same conditions for friction stir welding; i.e., a tool rotation speed of 800 rpm and a tool moving speed of 50 mm/min, were used for both the low carbon steel plates and the medium carbon steel plates. The friction stir welding was performed under control for maintaining the tool at a fixed position. FIGS. 4 and 5 respectively show sectional macro photographs of an obtained low carbon steel stirred portion and an obtained medium carbon steel stirred portion. No defect was found in each of the stirred portions, and it was confirmed that friction stir welding can be performed on 6 mm-thick steel plates by using the silicon nitride tool.

Through measurement of tool torque during friction stir welding, it was found that, in the case of the low carbon steel plates, the tool torque is 40 Nm, and, in the case of the medium carbon steel plates, the tool torque is 37 Nm; i.e., the tool torque in the case of the medium carbon steel plates is lower than the tool torque in the case of the low carbon steel plates. Notably, these torques are about 10% lower than those in the case where friction stir welding was performed under the same joining conditions by using a tool formed of PCBN and having the same shape as the silicon nitride tool used in this example.

Example 2

Figure 6:
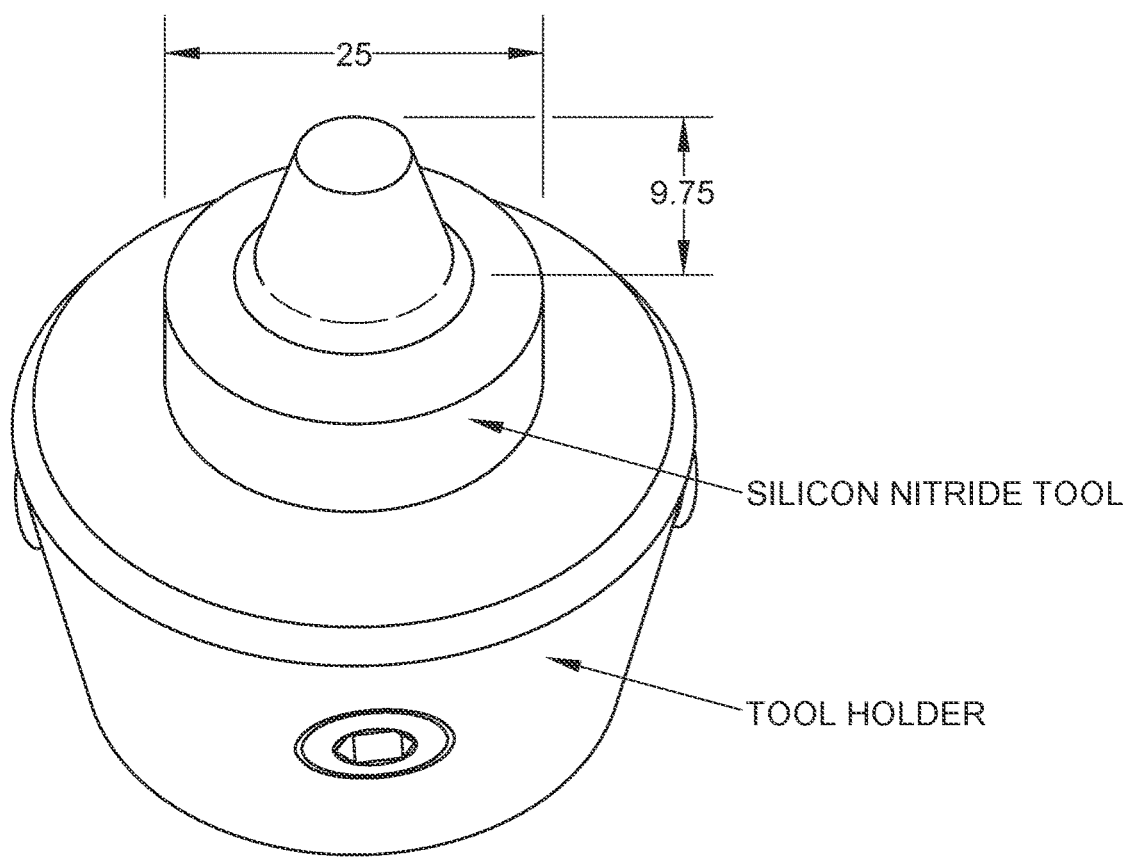
FIG. 6 is an exterior photograph of a silicon nitride tool used in Example 2.

By using a silicon nitride tool having a probe length of 9.75 mm, stir-in-plate friction stir welding was performed on low carbon steel plates and medium carbon steel plates each having a thickness of 10 mm. FIG. 6 shows an exterior photograph of the silicon nitride tool. The composition and internal texture of the silicon nitride tool are the same as those in Example 1. The shoulder diameter is 25 mm, the probe diameter at the root (shoulder bottom surface) is 8.2 mm, and the probe diameter at the distal end is 7.25 mm. Grooving or the like machining is not performed for the shoulder bottom surface and the probe surface, and these surfaces are smooth surfaces. A hacking plate formed of silicon nitride was disposed on the back surfaces of the workpieces. Notably, the composition of the medium carbon steel plates is the same as that in Example 1, and the composition (mass %) of the low carbon steel plates is shown in Table 2.

TABLE 2

| Material | C | Si | Mn | P | Fe |
|---|---|---|---|---|---|
| Low carbon steel | 0.06 | 0.25 | 1.3 | 0.01 | Bal. |

Figure 7:
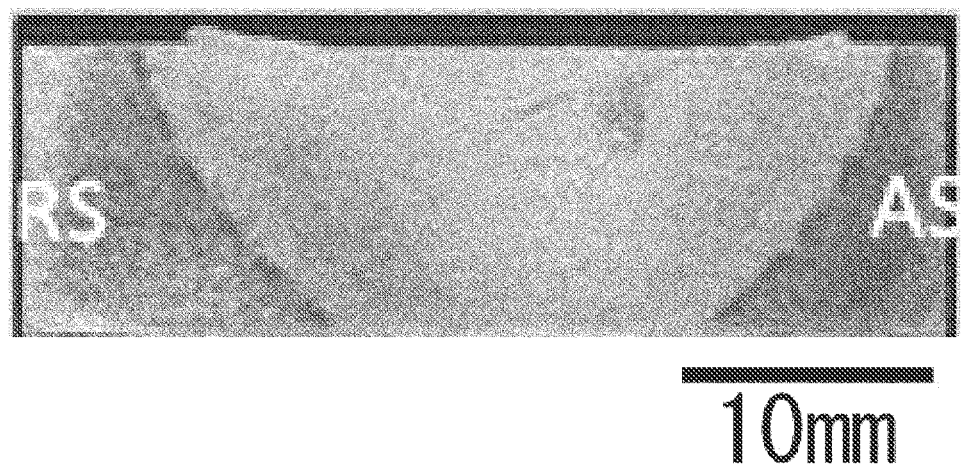
FIG. 7 is a sectional macro photograph of a low carbon steel stirred portion obtained in Example 2.
Figure 8:
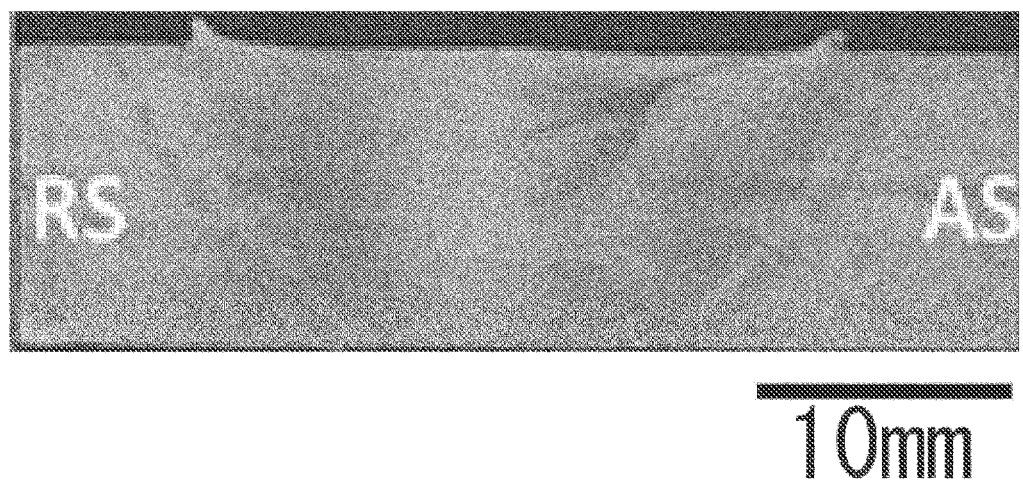
FIG. 8 is a sectional macro photograph of a medium carbon steel stirred portion obtained in Example 2.

The same conditions for friction stir welding; i.e., a tool rotation speed of 400 rpm and a tool moving speed of 50 mm/min, were used for both the low carbon steel plates and the medium carbon steel plates. The friction stir welding was performed under control for maintaining the tool at a fixed position. FIGS. 7 and 8 respectively show sectional macro photographs of an obtained low carbon steel stirred portion and an obtained medium carbon steel stirred portion. No defect was found in each of the stirred portions, and it was confirmed that friction stir welding can be performed on 10 mm-thick steel plates by using the silicon nitride tool.

Figure 9:
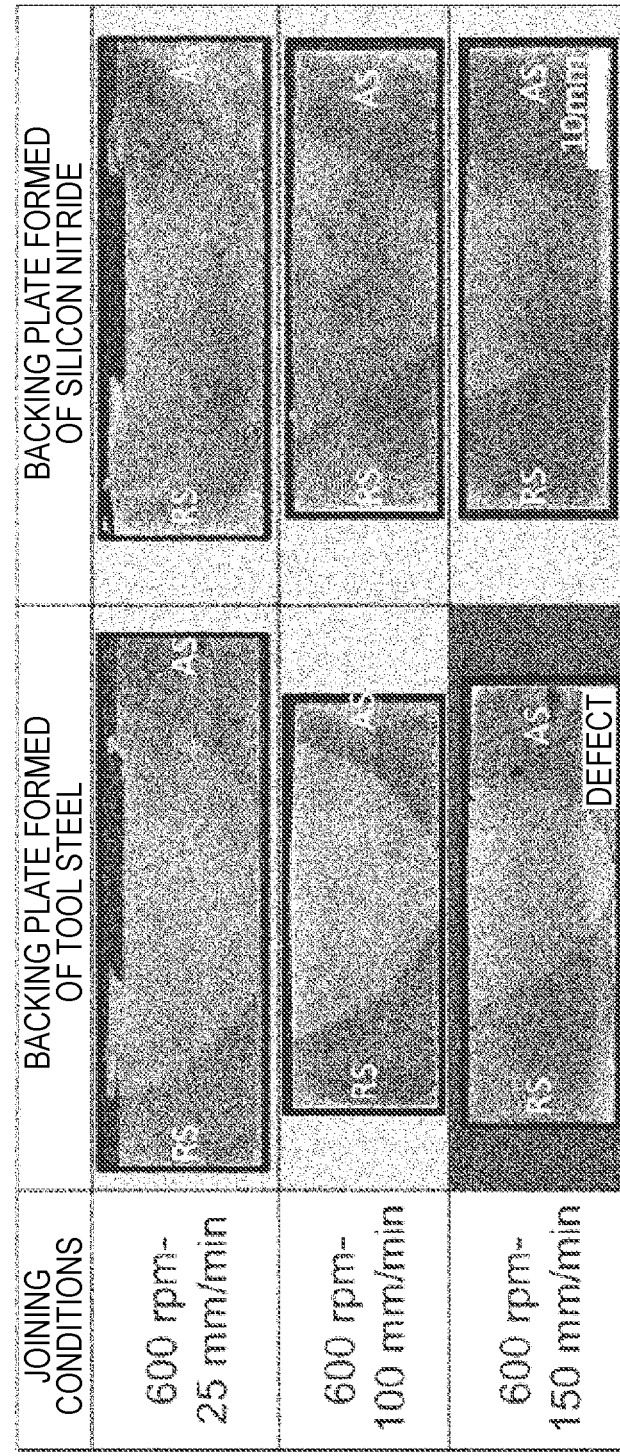
FIG. 9 is a sectional macro photograph of a stirred portion obtained in Example 2 (the influence of the material of a backing plate).

FIG. 9 shows sectional macro photographs of medium carbon steel stirred portions formed as a result of friction stir welding performed by setting the tool rotation speed to 600 rpm and the tool moving speed to 25 to 150 mm/min for the case where a backing plate formed of silicon nitride was used and the case where a backing plate formed of tool steel was used. In the case where a backing plate formed of tool steel was used, the width of each stirred portion became narrow near the back surfaces of the medium carbon steel plates, and a tunnel-shaped defect was formed when the tool moving speed was 150 mm/min. In contrast, in the case where a backing plate formed of silicon nitride was used, each stirred portion has an increased width, and no defect was formed. Conceivably, a satisfactory plastic flow was produced as a result of prevention of escape of heat from the back surfaces of the medium carbon steel plates.

Figure 10:
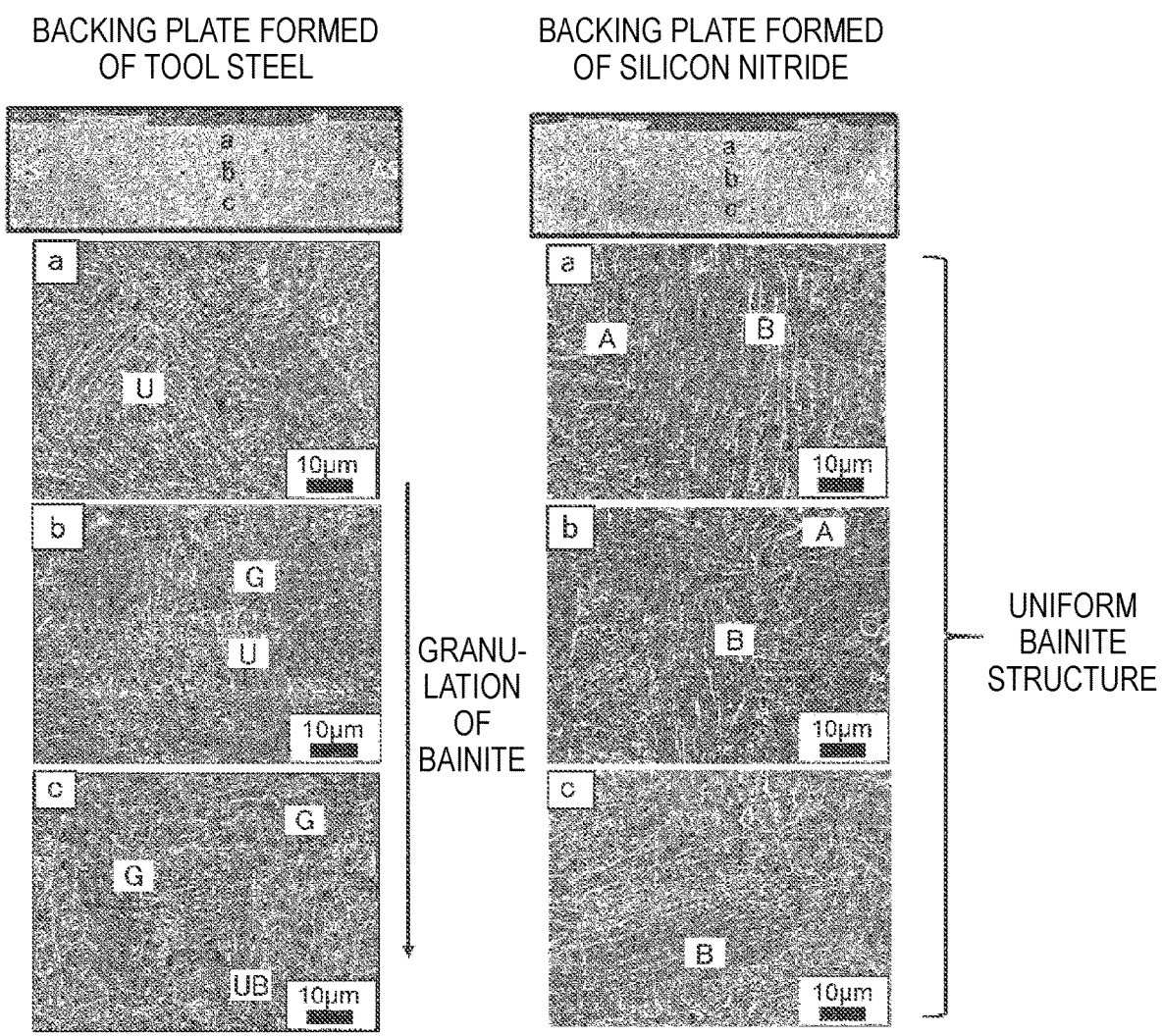
FIG. 10 shows the microstructure of the stirred portion obtained in Example 2 (the influence of the material of a backing plate).

FIG. 10 shows the microstructure of a stirred portion obtained through friction stir welding performed by using a backing plate formed of silicon nitride under joining conditions that the tool rotation speed was 600 rpm and the tool moving speed was 25 mm/min, and the microstructure of a stirred portion obtained through friction stir welding performed by using a backing plate formed of tool steel under the same joining conditions (observation positions are shown in respective sectional macro photographs). In the case where a backing plate formed of tool steel was used, the microstructure changes along the thickness direction, upper bainite is observed at the surface, and granular bainite is observed near the back surface. Meanwhile, in the case where a backing plate formed of silicon nitride was used, a formed structure is uniform in the thickness direction, and upper bainite is observed in all regions. When the temperature near the back surfaces during friction stir welding was measured by using a thermocouple, it was found that, in the case where a backing plate formed of silicon nitride was used, the temperature near the back surfaces was about 100° C. higher than that in the case where a backing plate formed of tool steel was used. These results show that, even in the case of thick steel plates, a structure which is uniform in the thickness direction can be formed through combined use of a silicon nitride tool and a backing plate formed of silicon nitride.

Figure 11:
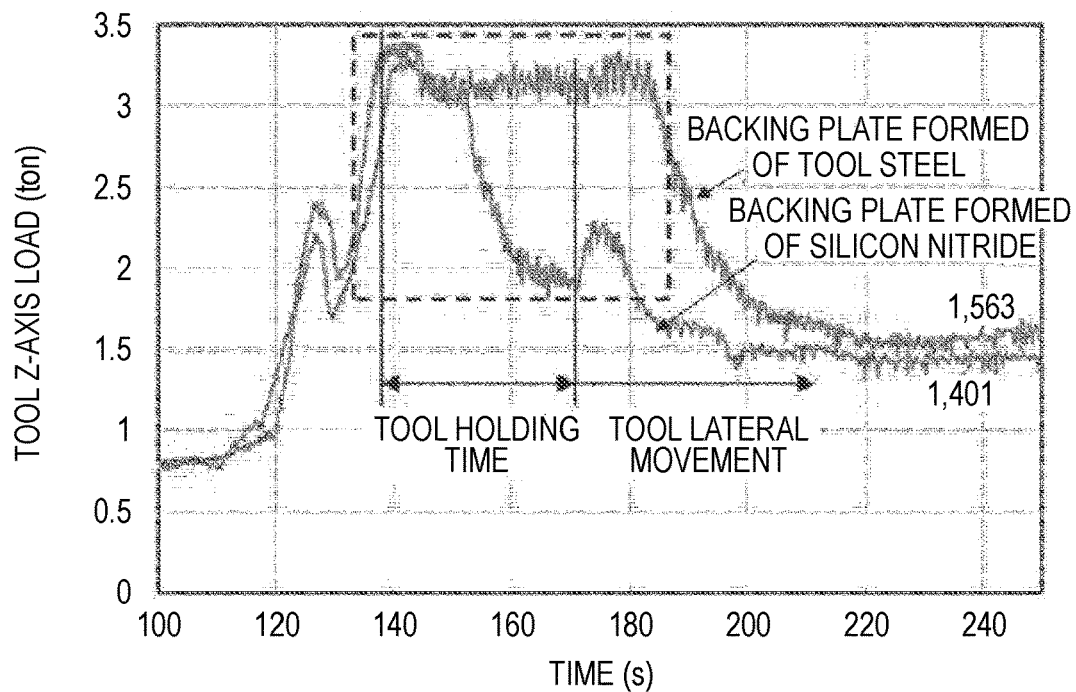
FIG. 11 is a diagram showing the Z-axis load of the tool in Example 2.

FIG. 11 shows the Z-axis load applied to a tool in the case where friction stir welding was performed by using a backing plate formed of silicon nitride under joining conditions that the tool rotation speed was 600 rpm and the tool moving speed was 25 mm/min and in the case where friction stir welding was performed by using a backing plate formed of tool steel under the same joining conditions. The tool was vertically pressed into the workpieces at a joining position, was held at that portion for a predetermined period of time, and was moved in a horizontal direction (to start joining operation). In the case where the backing plate formed of tool steel was used, the Z-axis load was constant while the tool position was held. In contrast, in the case where the backing plate formed of silicon nitride was used, the Z-axis load decreased sharply. Also, in the case where the backing plate formed of silicon nitride was used, the Z-axis load applied to the tool during horizontal movement thereof was lower than that in the case where the backing plate formed of tool steel was used. These results show that the tool load during friction stir welding can be reduced effectively by combined use of a silicon nitride tool and a backing plate formed of silicon nitride.

Figure 12:
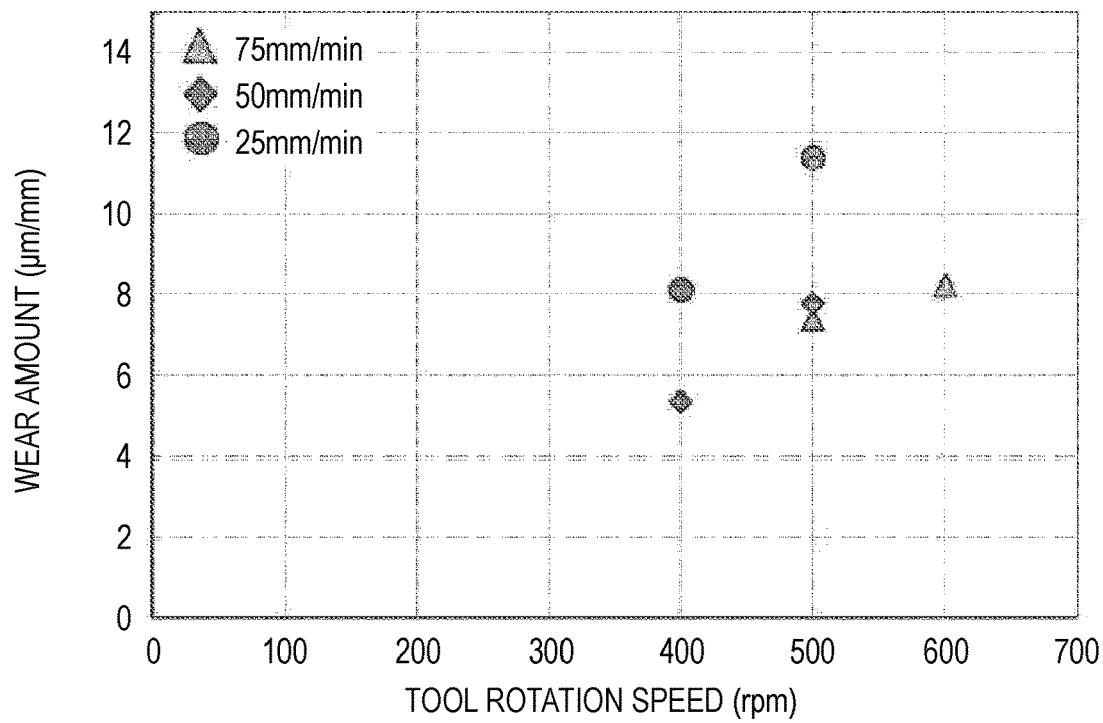
FIG. 12 shows the amount of wear of the tool in Example 2 (low carbon steel plate).
Figure 13:
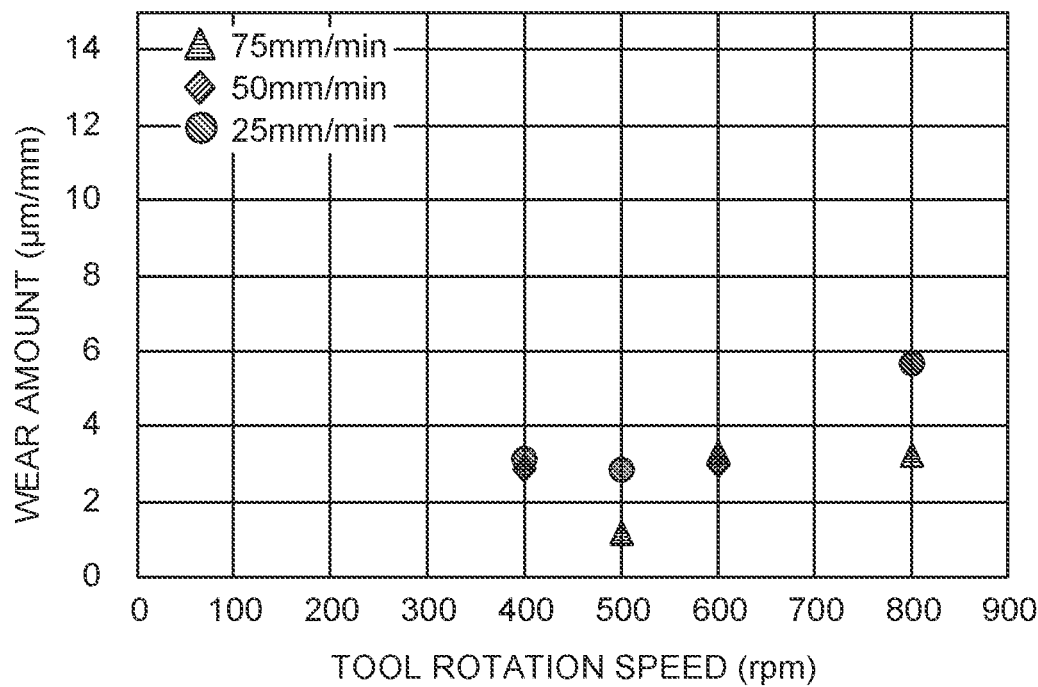
FIG. 13 shows the amount of wear of the tool in Example 2 (medium carbon steel plate).

FIG. 12 shows the amount of tool wear in the case where a silicon nitride tool and a backing plate formed of silicon nitride were used in combination so as to perform friction stir welding for joining low carbon steel plates under joining conditions that the tool rotation speed was 400 to 800 rpm and the tool moving speed was 25 to 75 mm/min. FIG. 13 shows the amount of tool wear in the case where a silicon nitride tool and a backing plate formed of silicon nitride were used in combination so as to perform friction stir welding for joining medium carbon steel plates under the same joining conditions. The distance of single friction stir welding was set to about 300 mm, friction stir welding was repeated, and the shape of the tool after each joining operation was measured by a three-dimensional shape measuring device. Also, the average wear amount of the side surface of the probe portion was obtained from changes in the obtained shapes.

In any condition, the average wear amount of the tool is several μm/mm, and the tool has sufficiently high wear resistance as a practical friction stir welding tool. The amount of wear increases as the tool rotation speed increases and as the tool moving speed decreases. Conceivably, such a phenomenon occurred due to an increase in joining temperature. Also, in the case of medium carbon steel, wear is suppressed clearly.

Example 3

Figure 14:
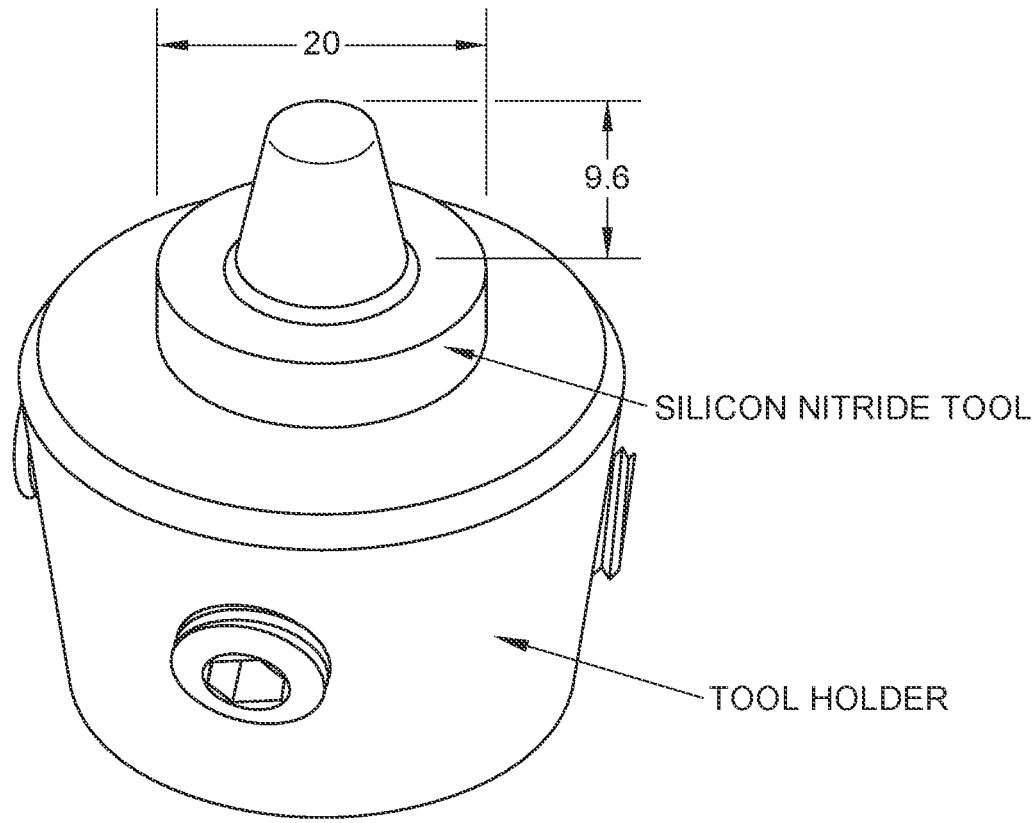
FIG. 14 is an exterior photograph of a silicon nitride tool used in Example 3.

By using a silicon nitride tool having a probe length of 9.6 mm, stir-in-plate friction stir welding was performed on low carbon steel plates and medium carbon steel plates each having a thickness of 10 mm. FIG. 14 shows an exterior photograph of the silicon nitride tool. The composition and structure of the silicon nitride tool are the same as those in Example 1. The shoulder diameter is 20 mm, the probe diameter at the root (shoulder bottom surface) is 7.5 mm, and the probe diameter at the distal end is 6.25 mm. As shown in FIG. 14, the shoulder diameter relative to the probe length is greatly small as compared with a general friction stir welding tool. Grooving or the like machining is not performed for the shoulder bottom surface and the probe surface, and these surfaces are smooth surfaces. Also, a backing plate formed of silicon nitride was disposed on the back surfaces of the workpieces.

Figure 15:
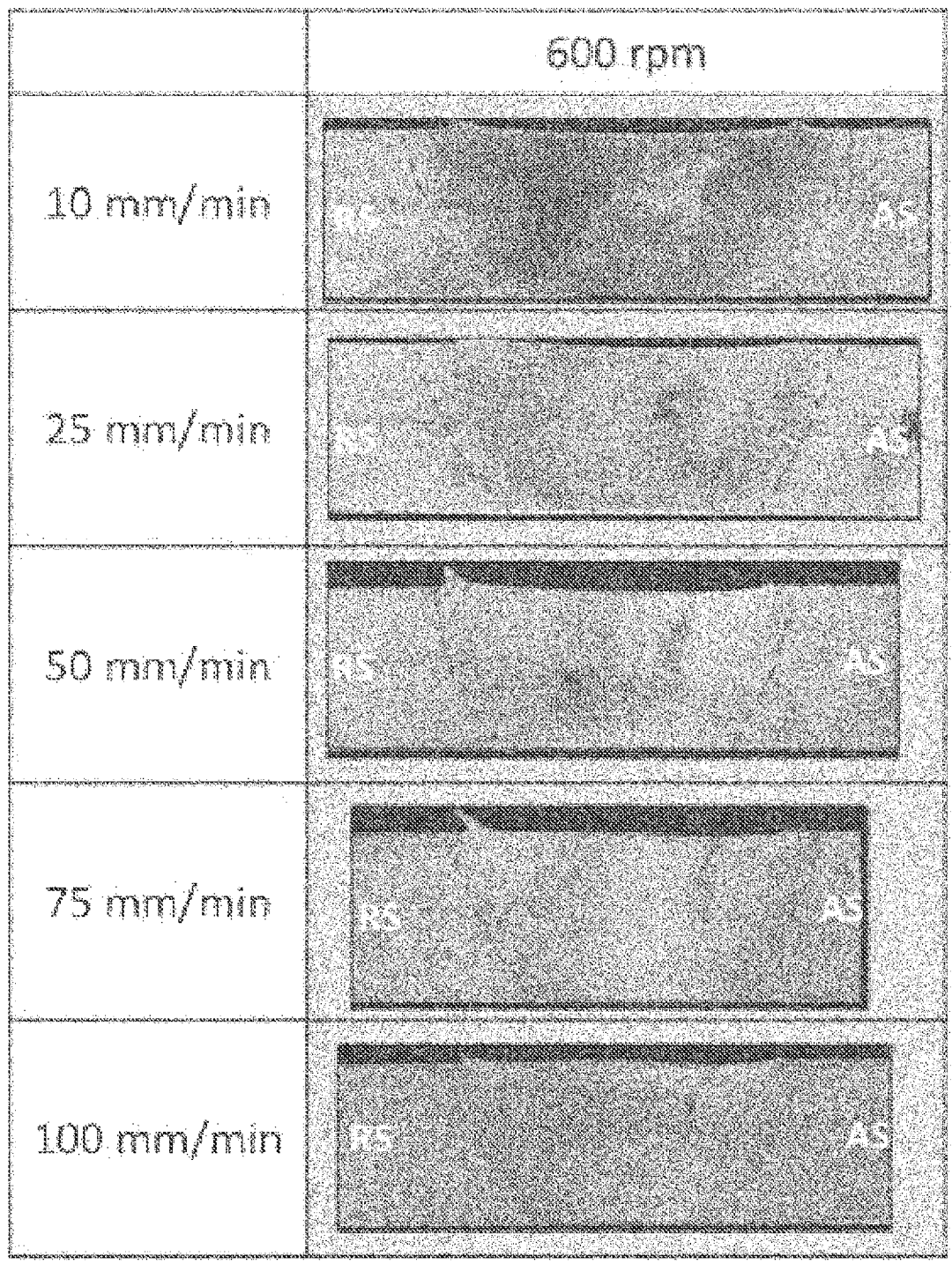
FIG. 15 is a sectional macro photograph of a medium carbon steel stirred portion Obtained in Example 3.

The workpieces were formed of medium carbon steel having a composition shown in Table 1. The tool rotation speed was fixed to 600 rpm, and the tool moving speed was changed in a range of 10 to 100 mm/min (constant tool position control). FIG. 15 shows sectional macro photographs of obtained medium carbon steel stirred portions. No defect was observed in each of the stirred portions. From this, it was confirmed that friction stir welding can be performed on 10 mm-thick steel plates by using a relatively small silicon nitride tool having a shoulder diameter of 20 mm.

The representative embodiments of the present invention have been described above. Here, the features of the embodiments of the friction stir welding tool and the friction stir welding method according to the present invention are simply described in the following sections [1] to [10].

[1] A friction stir welding tool (1) characterized by comprising:

a shoulder portion (2); and a probe portion (6) provided on a bottom surface of the shoulder portion (2), wherein the probe portion (6) has a length of 5.5 mm or more, and a ceramic material whose main phase is silicon nitride or sialon is used as a base material.

[2] The friction stir welding tool (1) described in the above section [1], wherein the diameter of the probe portion (6) decreases continuously from the bottom surface toward a distal end of the probe portion, and grooving and/or chamfering is not performed on the probe portion (6).

[3] The friction stir welding tool (1) described in the above section [1] or [2], wherein the diameter of the shoulder portion (2) is 20 mm or less.

[4] The friction stir welding tool (1) described in any one of the above sections [1] to [3], wherein the length of the probe portion (6) is 9.5 mm or more.

[5] The friction stir welding tool (1) described in any one of the above sections [1] to [4], wherein the ceramic material contains a rare-earth element and aluminum.

[6] A friction stir welding method characterized in that
plate members are friction stir welded by using the friction stir welding tool (1) described in any one of the above sections [1] to [5]; and
the shoulder portion (2) of the friction stir welding tool (1) is brought into contact with the plate members, while the probe portion (6) of the friction stir welding tool (1) is inserted into the plate members by an amount of 5.5 mm or more.

[7] The friction stir welding method described in the above section [6], wherein the plate members are steel plates.

[8] The friction stir welding method described in the above section [7], wherein the steel plates contains carbon in an amount of 0.2 mass % or more.

[9] The friction stir welding method described in any one of the above sections [6] to [8], wherein the method comprises holding the position of the friction stir welding tool (1) for a predetermined period of time after the probe portion (6) has been inserted into the plate members; and laterally moving the friction stir welding tool (1) after reaction forces applied from the plate members to the friction stir welding tool (1) have decreased.

[10] The friction stir welding method described in any one of the above sections [6] to [9], wherein the method comprises disposing a backing plate on back surfaces of the plate members, the backing plate being lower in thermal conductivity than the plate members.

The present application is based on Japanese Patent Application No. 2019-042785 filed on Mar. 8, 2019, and the entire content thereof is incorporated herein by reference.

INDUSTRIAL APPLICABILITY

The friction stir welding tool and the friction stir welding method of the present invention can be used for performing friction stir welding on plate members having a large thickness. The present invention having this effect can be applied to friction stir welding of thick plates, which has conventionally been difficult to perform at low cost.

REFERENCE SIGNS LIST

1: friction stir welding tool
2: shoulder portion
4: body portion
6: probe portion

What is claimed is:

1. A friction stir welding method characterized in that plate members are friction stir welded by using a friction stir welding tool including
a shoulder portion, and
a probe portion provided on a bottom surface of the shoulder portion, the probe portion having a length of 5.5 mm or more, the probe portion decreasing in diameter continuously from the bottom surface toward a distal end of the probe portion, and grooving and/or chamfering is not performed on the probe portion such that the probe portion has a smooth surface,
wherein a ceramic material whose main phase is silicon nitride or sialon is used as a base material;
the shoulder portion of the friction stir welding tool is brought into contact with the plate members, while the probe portion of the friction stir welding tool is inserted into the plate members by an amount of 5.5 mm or more;
monitoring reaction forces applied from the plate members to the friction stir welding tool;
holding the position of the friction stir welding tool for a predetermined period of time after the probe portion has been inserted into the plate members; and
laterally moving the friction stir welding tool after the reaction forces applied from the plate members to the friction stir welding tool have decreased below a threshold value.

2. A friction stir welding method according to claim 1, wherein the shoulder portion has a diameter of 20 mm or less.

3. A friction stir welding method according to claim 1, wherein the length of the probe portion is 9.5 mm or more.

4. A friction stir welding method according to claim 1, wherein the ceramic material contains a rare-earth element and aluminum.

5. A friction stir welding method according to claim 1, wherein the plate members are steel plates.

6. A friction stir welding method according to claim 5, wherein the steel plates contains carbon in an amount of 0.2 mass % or more.

7. A friction stir welding method according to claim 1, wherein the method comprises disposing a backing plate on back surfaces of the plate members, the backing plate being lower in thermal conductivity than the plate members.

8. A friction stir welding method according to claim 1, wherein the threshold value is 2 tons.

9. A friction stir welding method according to claim 1, wherein the threshold value is about ⅔ of a maximum reaction force measured while holding the position of the friction stir welding tool.

10. A friction stir welding method according to claim 1, wherein the plate members are steel plates containing carbon in an amount of 0.2 mass % or more; and
wherein the method comprises disposing a backing plate formed of silicon nitride on back surfaces of the plate members.

* * * * *